US006811696B2

(12) United States Patent
Wang et al.

(10) Patent No.: US 6,811,696 B2
(45) Date of Patent: Nov. 2, 2004

(54) HYDROPHOBIC MEMBRANE MATERIALS FOR FILTER VENTING APPLICATIONS

(75) Inventors: I-fan Wang, San Diego, CA (US); Richard McDonogh, San Diego, CA (US); James E. Rudolph, Jr., Middletown, DE (US)

(73) Assignee: Pall Corporation, East Hills, NY (US)

( * ) Notice: Subject to any disclaimer, the term of this patent is extended or adjusted under 35 U.S.C. 154(b) by 241 days.

(21) Appl. No.: 10/123,074

(22) Filed: Apr. 12, 2002

(65) Prior Publication Data

US 2003/0192826 A1 Oct. 16, 2003

(51) Int. Cl.[7] .............................................. B01D 71/26
(52) U.S. Cl. ........................ 210/500.36; 210/500.42; 210/500.22; 210/500.23; 210/500.27; 98/4; 264/41; 264/650
(58) Field of Search ...................... 210/500.36, 500.22, 210/500.42, 500.23, 500.27; 96/4; 264/41, 650

(56) References Cited

U.S. PATENT DOCUMENTS

| | | | | |
|---|---|---|---|---|
| 4,990,294 A | * | 2/1991 | Yen et al. ...................... 264/41 |
| 5,032,274 A | * | 7/1991 | Yen et al. ............... 210/500.42 |
| 5,156,780 A | | 10/1992 | Kenigsberg et al. .......... 264/22 |
| 5,194,322 A | | 3/1993 | Doran ........................ 428/267 |
| 5,217,802 A | | 6/1993 | Scarmoutzos ............ 428/304.4 |
| 5,328,613 A | * | 7/1994 | Beall et al. ............ 210/500.27 |
| 5,387,378 A | | 2/1995 | Pintauro et al. .............. 264/48 |
| 5,462,586 A | | 10/1995 | Sugiyama et al. ............. 96/13 |
| 5,463,005 A | * | 10/1995 | Desmarteau ................ 526/240 |
| 5,500,167 A | * | 3/1996 | Degen .......................... 264/41 |
| 5,554,414 A | | 9/1996 | Moya et al. ................. 427/244 |
| 6,013,688 A | * | 1/2000 | Pacheco et al. ............... 521/64 |
| 6,119,369 A | * | 9/2000 | Rodewald ..................... 34/624 |
| 6,179,132 B1 | * | 1/2001 | Moya ........................ 210/490 |
| 6,273,271 B1 | * | 8/2001 | Moya ........................ 210/490 |
| 6,277,281 B1 | * | 8/2001 | Ditter et al. ................ 210/645 |
| 6,375,876 B1 | * | 4/2002 | Kessler et al. ................ 264/41 |
| 6,440,306 B1 | * | 8/2002 | Ditter et al. ........... 210/500.41 |
| 6,565,782 B1 | * | 5/2003 | Wang et al. ................... 264/41 |
| 6,688,477 B2 | * | 2/2004 | Kalthod ..................... 210/490 |

FOREIGN PATENT DOCUMENTS

| | | |
|---|---|---|
| EP | 0 804 961 A1 | 11/1997 |
| JP | XP-002250658 | 12/1997 |
| JP | 09324067 | 12/1997 |
| WO | WO 99/61130 A1 | 12/1999 |
| WO | WO 02/102500 A1 | 12/2002 |
| WO | WO 03/057961 A2 | 7/2003 |

OTHER PUBLICATIONS

PCT International Search Report, Aug. 22, 2003, PCT No. PCT/US03/11395.
XP–002250659, Apr. 10, 1999, Unknown (Abstract published in GB Database).

* cited by examiner

Primary Examiner—Ana Fortuna
(74) Attorney, Agent, or Firm—Knobbe Martens Olson & Bear LLP

(57) ABSTRACT

The present invention relates to filtration media having both hydrophobic (water-repellent) properties. The filtration media are produced using a fluorothermoplastic material, such as a terpolymer of tetrafluoroethylene, vinylidene fluoride, and hexafluoropropylene. The invention also relates to methods of preparing such filtration media using casting solution phase inversion.

8 Claims, 8 Drawing Sheets

HYDROPHOBIC MEMBRANE MATERIALS FOR FILTER VENTING APPLICATIONS

FIELD OF THE INVENTION

The present invention relates to filtration media having both hydrophobic (water-repellent) properties. The filtration media are produced using a fluorothermoplastic material, such as a terpolymer of tetrafluoroethylene, vinylidene fluoride, and hexafluoropropylene. The invention also relates to methods of preparing such filtration media using casting solution phase inversion.

BACKGROUND OF THE INVENTION

Hydrophobic filters are used in filtration of gases, in venting filters, and as gas vents. These hydrophobic filters allow gases and vapors to pass through the filter while liquid water is repelled by the filter.

Polytetrafluoroethylene (PTFE) has been the most commonly used material in filters for gas venting. PTFE is chemically and biologically inert, has high stability, and is hydrophobic. PTFE filters therefore allow gases to be selectively vented while being impervious to liquid water.

Hydrophobic membranes are used as filters in healthcare and related industries, for example, as vent filters for intravenous (IV) fluids and other medical devices. In the healthcare industry, the membrane is sterilized before use. PTFE membranes can be sterilized for these health-related applications with steam or by chemical sterilization without losing integrity.

Treating PTFE membranes with steam can cause pore blockage due to condensation of oil from the machinery used to generate the steam. The resulting loss of air permeability reduces the membrane's ability to serve as an air vent. Although chemical sterilization minimizes exposure of the membrane to oil, chemical sterilization uses toxic chemicals and can generate byproducts, which cause waste disposal problems. Ionizing radiation has also been used for sterilization of materials used in medical and biological devices. PTFE may become unstable when exposed to ionizing radiation. Irradiated PTFE membranes have greatly reduced mechanical strength and cannot be used in applications where they are subjected to even moderate pressures.

Perhaps the two biggest drawbacks to PTFE as a filter for venting gases are the high cost and the low air permeability of PTFE membranes. PTFE membranes are formed by extruding and stretching PTFE. Processing methods to form PTFE membranes may be expensive. Furthermore, the extruding and stretching processes used to form PTFE membranes create a membrane which has relatively, low air permeability.

As a result, efforts have been made to identify alternative substrates which are less expensive and have higher air permeability than PTFE and which can be modified to be hydrophobic.

Coating filtration substrates allows one to retain the desirable bulk properties of the substrate while only altering the surface and interfacial properties of the substrate. Coating substrates to increase their hydrophobic properties has not been very practical, because the coatings can reduce permeability. Furthermore, many of the coating materials are expensive.

Scarmoutzos (U.S. Pat. No. 5,217,802) modified the surface of substrates made of nylon, polyvinylidene difluoride (PVDF), and cellulose by treating the substrate with a fluorinated acrylate monomer. The substrate was sandwiched between two sheets of polyethylene, and the monomer was polymerized by exposing to ultraviolet light. The resulting composite filters had hydrophobic and oleophobic surfaces. The air permeability of the filters decreases with time.

Moya (U.S. Pat. No. 5,554,414) formed composite filters from polyethersulfone and PVDF membranes with a method similar to that of Scarmoutzos. The resulting filters did not wet with water or hexane. The disadvantage of the Moya filters is that air permeability of the treated filters was lower than the untreated substrates, and the fluorinated monomer is expensive.

Sugiyama et al. (U.S. Pat. No. 5,462,586) treated nylon fabric and PTFE membranes with solutions containing two different preformed fluoropolymers. The treated filters were resistant to water and oils. The durability of filters coated with preformed polymers is often less than that for filters where the coating is formed by polymerizing a monomer on the surface of the substrate, however.

Kenigsberg et al. (U.S. Pat. No. 5,156,780) treated a variety of membranes and fabrics with solutions of fluoroacrylate monomers and formed coatings on the substrate by polymerizing the monomer. The coating conferred oil and water repellency onto the substrate. However, the airflow through the treated membrane was reduced, compared to the untreated membrane.

Hydrophobic media suitable for garments have been made by extruding mixtures of polypropylene or PTFE and the fluorochemical oxazolidinone as disclosed in U.S. Pat. No. 5,260,360. The media made by extrusion tend to have relatively low air permeability.

In copending U.S. application Ser. No. 09/323,709 filed Jun. 1, 1999 (incorporated herein by reference in its entirety), oleophobic and hydrophobic filters are prepared by forming a polydimethylsiloxane coating on a polymeric substrate by polymerizing vinyl terminated siloxane with a crosslinker such as hydrosilicon in the presence of a catalyst.

In copending U.S. application Ser. No. 09/778,630 filed Feb. 7, 2001 (incorporated herein by reference in its entirety), oleophobic and hydrophobic filters are prepared by forming a fluorosulfone oligomer coating on a substrate, such as a hydrophobic or hydrophilic membrane or other filtration medium.

In copending Australian Application Number PR5843 filed Jun. 20, 2001 (incorporated herein by reference in its entirety), hollow fiber membranes for use in microfiltration are prepared from a terpolymer of tetrafluoroethylene, vinylidene fluoride, and hexafluoropropylene.

SUMMARY OF THE INVENTION

There is a need for a hydrophobic filter, which is inexpensive and has high air permeability. Specifically, there is a need for a filter medium that is hydrophobic and that may be readily and reproducibly produced through simple casting solution phase inversion processes.

DETAILED DESCRIPTION OF THE PREFERRED EMBODIMENT

Figure 1A:
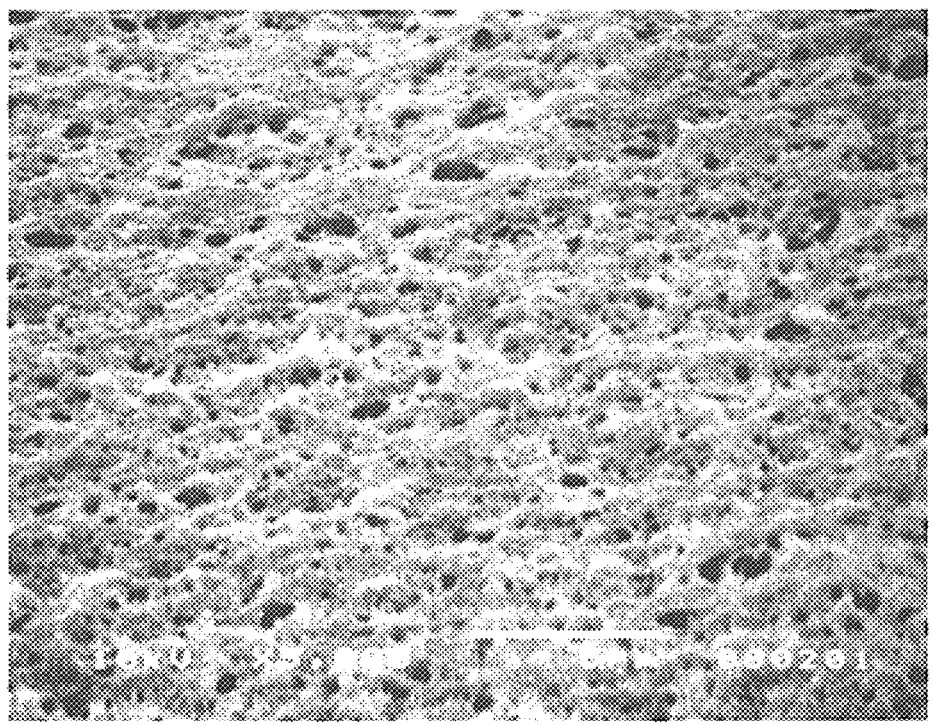
FIG. 1a provides a SEM image of the skin side of the membrane of Example 1.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

The preferred embodiments provide hydrophobic filters that have asymmetric or isotropic structures, high gas permeabilities, and that repel water. The preferred embodiments also include methods of preparing such filters by casting solution phase inversion.

The filter media are prepared using a fluorothermoplastic, such as a terpolymer of tetrafluoroethylene (TFE), vinylidene fluoride (VDF), and hexafluoropropylene (HFP). The filters have high permeabilities for airflow and reject liquid water, as evidenced by high water penetration pressures. The filters are useful, for example, as air filters or vent filters for intravenous (IV) or other medical devices.

Introduction

Casting solution phase inversion is a process wherein a casting dope is spread in a film over a smooth surface, then the film, or nascent membrane, is passed through a quenching (or coagulating) solution, e.g., water, to extract the water miscible components from the membrane. In preferred embodiments, such techniques are used to prepare membranes from a solution or dispersion of PTFE, PVDF, and HFP.

The Polymeric Substrate

The membranes of preferred embodiments may be prepared from a terpolymer of tetrafluoroethylene, hexafluoropropylene, and vinylidene fluoride (hereinafter referred to as "fluorothermoplastic terpolymer"). Preferably, the terpolymer includes from about 20 or less to about 65 wt. % or more vinylidene fluoride, more preferably from about 25, 30, or 35 to about 40, 45, 50, 55, or 60 wt. % vinylidene fluoride, and most preferably about 36.5 wt. % vinylidene fluoride. Preferably, the terpolymer includes from about 30 or less to about 70 wt. % or more tetrafluoroethylene, more preferably from about 35 or 40 to about 45, 50, 55, 60, or 65 wt. % tetrafluoroethylene, and most preferably about 44.6 wt. % tetrafluoroethylene. Preferably, the terpolymer includes from about 10 or less to about 20 wt. % or more hexafluoroethylene, more preferably from about 11, 12, 13, 14, 15, 16, 17, or 18 to about 19 wt. % hexafluoroethylene, and most preferably about 18.9 wt. % hexafluoroethylene.

Suitable fluorothermoplastic terpolymers include Dyneon™ Fluorothermoplastics available from Dyneon LLC of Oakdale Minn. Particularly preferred is Dyneon™ THV 220A, which is composed of tetrafluoroethylene, hexafluoropropylene, and vinylidene fluoride in the form of an agglomerate that is hydrophobic and is soluble in ketones, esters, and ethers. Dyneon™ THV 220A has a melting point of 120° C., a melt flow index of 20 (265° C./5 kg), a specific gravity of 1.95 g/cc, tensile at break of 20 MPa, elongation at break of 600%, and flexural modulus of 80 MPa. Other Dyneon™ fluorothermoplastic terpolymers include Dyneon™ THV 220, Dyneon™ THV 410, Dyneon™ THV 500, and Dyneon™ THVx610. The Dyneon™ fluorothermoplastic terpolymers with lower numbers, e.g., THV 220, are generally preferred due to the ease with which satisfactory casting dopes may be prepared. The Dyneon™ fluorothermoplastic terpolymers with higher numbers, e.g., THV 410, THV 500, and THVx610, have progressively higher percentages of tetrafluoroethylene. The higher the percentage of tetrafluoroethylene, the less soluble the fluorothermoplastic terpolymer is in typical solvents, thus making selection of an appropriate solvent or solvents and preparation of casting solutions or dispersions more difficult. For example, satisfactory solutions of Dyneon™ THV 410 may be prepared using n-propylamine or di-n-propylamine.

A single fluorothermoplastic terpolymer or combination of a fluorothermoplastic terpolymer and one or more additional polymers may be preferred. The additional polymer may include another fluorothermoplastic terpolymer, or any other suitable polymer. Suitable polymers may include any suitable homopolymer, copolymer, or terpolymer, including but not limited to polysulfone, polyethersulfone (PES), polyarylsulfone, fluorinated polymers such as polyvinylidene fluoride (PVDF), polyolefins including polyethylene and polypropylene, polytetrafluoroethylene (PTFE or Teflon™), poly(tetrafluoroethylene-co-ethylene) (ECTFE or Halar™), acrylic copolymers, polyamides or nylons, polyesters, polyurethanes, polycarbonates, polystyrenes, polyethylene-polyvinyl chloride, polyacrylonitrile, cellulose, and mixtures or combinations thereof.

The fluorothermoplastic terpolymer may be subjected to a pretreatment, for example grafting or crosslinking, prior to forming a membrane casting dope, or may be subjected to a post-treatment, for example grafting or crosslinking, after a membrane is cast. There is no particular molecular weight range limitation for suitable fluorothermoplastic terpolymer. Likewise, there is no particular limitation on the weight ratio of the tetrafluoroethylene, hexafluoropropylene, and vinylidene fluoride monomers in the fluorothermoplastic terpolymer. Various molecular weights and/or different monomer ratios may be preferred for membranes to be used for certain applications.

The Membrane

Membranes that may be prepared in accordance with preferred embodiments include ultrafiltration and microfiltration asymmetric and isotropic membranes. The term "isotropic" as used herein relates to a membrane possessing a constant pore size across the thickness of the membrane. The term "asymmetric" as used herein relates to a membrane possessing a pore size gradient. That is, asymmetric membranes possess their smallest or finest pores in or adjacent to one surface of the membrane, generally referred to as the "skin" surface or "shiny" side of the membrane. The increase in pore size between the skin surface and the opposite surface of the membrane is generally gradual, with the smallest pore size nearest the skin surface and the largest pores being found at or adjacent to the opposite, coarse-pored surface, generally referred to as the "open" surface or the "dull" side of the membrane. Another variety of asymmetric membrane, commonly described as having a "funnel-with-a-neck" structure, includes both an asymmetric region and an isotropic region, the isotropic region having a uniform pore size. The isotropic region typically extends from the skin surface of the membrane through about 5–80% of the thickness of the membrane, more preferably from about 15–50% of the thickness of the membrane. Symmetric membranes exhibit a substantially uniform pore size throughout the thickness of the membrane. Although asymmetric membranes are generally preferred for filtering applications, in certain embodiments a symmetric membrane may be preferred.

Some filtration membranes have a layer of relatively small pores on one side (termed herein a "skin") when compared to the other side, while other membranes do not contain this type of layer (termed herein "skinless"). A skinned membrane is typically created by quenching a polymeric casting dope of sufficient polymer concentration in a strong nonsolvent. The resultant membrane has considerably smaller pores on the "skin" face than on the opposite face.

The membranes of preferred embodiments have a porous supporting structure between the two sides of the membrane. The nature of the porous supporting structure of a membrane may depend on the composition of the casting dope and the quenching bath. The supporting structure may include closed cells, open cells of substantially the same pore size from one side of the membrane to the other, open cells with a gradation of pore sizes from one side of the membrane to the other, or finger-type structures, generally referred to as "macrovoids." Macrovoids typically will vary substantially in size from the surrounding porosity, and generally do not communicate with surface pores. In a preferred embodiment, the porous supporting structure includes a network of structural surfaces capable of contacting a filter stream, defined herein as including any fluid substance, including liquids and gases, that passes through the membrane via the porous supporting structure. In preferred embodiments, the supporting structure includes reticulated network of flow channels. In particularly preferred embodiments, the supporting structure includes either no macrovoids or an insignificant number of macrovoids.

Whether the membrane has an asymmetric or funnel-with-a-neck structure may depend upon several factors involved in the preparation of the membrane, including the type and concentration of the polymer, the solvent, and the nonsolvent; the casting conditions such as the knife gap, and the dope temperature; environmental factors such as the exposure time between casting and quenching, and the humidity of the exposure atmosphere; and the composition and temperature of the quench bath.

In particularly preferred embodiments, the membranes have an asymmetric structure wherein an increase in pore size is observed from one side of the membrane to the other. In various embodiments, the asymmetry in pore size between the skin side and dull side of the membrane may range from about 1:1.5 or less, 1:2, 1:3, 1:4, 1:5, 1:10, 1:20, 1:50, 1:100, 1:500, 1:1000 or greater.

Suitable membranes may typically possess porosities characteristic of ultrafiltration or microfiltration membranes. Membranes within the ultrafiltration range preferably possess molecular weight cutoffs of from about 10,000 Daltons to about 1,000,000 Daltons and may have pore diameters from about 0.001 $\mu$m to about 0.05 $\mu$m on the skin side of the membrane. Microfiltration membranes typically possess pore diameters of at least about 0.01 or about 0.05 $\mu$m to about 5, 6, 7, 8, 9, 10, 15, or 20 $\mu$m on the skin side of the membrane. While the membranes of preferred embodiments typically possess porosities characteristic of ultrafiltration or microfiltration membranes, in certain embodiments porosities less than 0.001 $\mu$m or greater than 20 $\mu$m.

The fluorothermoplastic terpolymer membranes that may be prepared according to the preferred embodiments may be in any suitable shape or form, including, but not limited to, sheet and hollow fiber cast polymer membranes. Suitable membranes further include both those membranes that are cast from a single polymer solution or dope, referred to as "integral" membranes, as well as non-integral or composite membranes that are cast from more than one polymer solution or dope to form a layered or composite membrane. Composite membranes may also be assembled from two or more fully formed membranes after casting, for example, by lamination or other suitable methods. Preparation of composite membranes by lamination is discussed further in copending U.S. patent applications Ser. No. 09/694,120 filed on Oct. 20, 2000 and entitled "LAMINATES OF ASYMMETRIC MEMBRANES," and Ser. No. 09/694,106 also filed on Oct. 20, 2000 and also entitled "LAMINATES OF ASYMMETRIC MEMBRANES," each of which is incorporated herein by reference in its entirety.

The filtration media prepared from the membranes of preferred embodiments may include composites, such as, for example, composites having different layers of various media, composites having multiple layers of the same medium, or composites having layers of the same medium, but of different pore sizes, porosities, geometries, orientations, and the like. Suitable media that may be used in combination with the fluorothermoplastic terpolymer membranes of preferred embodiments include, but are not limited to, hollow fiber media, melt blown or other non-woven media, woven media, extruded media, and sedimented media. Suitable melt blown media include, but are not limited to, media including polymers such as polyester, polypropylene or ECTFE, polyethylene or other polyolefins, nylon, and the like, and are commercially available from U.S. Filter/Filterite Division, Timonium, Md.

The Casting Dope

The fluorothermoplastic terpolymer membranes of the preferred embodiments are preferably prepared from stable, clear homogeneous solutions and/or stable colloidal dispersions. The solutions or dispersions can be prepared through the use of solvents alone, or in combination with nonsolvents.

The membranes are generally prepared from a casting solution or dispersion (also referred to as a casting dope) of the fluorothermoplastic terpolymer, along with particular concentrations of polymer solvents and nonsolvents. The concentration of the polymer in the casting dope is low enough to form a substantially all-reticulated structure, but high enough to produce a coherent membrane. If the polymer concentration is too low, the resulting membrane can have inadequate coherency and, in the extreme case, only dust is formed. If the polymer concentration is too high, the membrane structure is not substantially reticulated and can contain at least some granular structures.

Although the appropriate concentration of the fluorothermoplastic terpolymer varies somewhat depending upon the particular conditions used, (e g., solvents, etc.), the fluorothermoplastic terpolymer concentration in the casting dope is generally from about 5 wt. % or less to about 30 wt. % or more. Typically, the casting dope contains from about 10 wt. % to about 25 wt. % fluorothermoplastic terpolymer, preferably the casting dope includes about 11, 12, 13, 14, or 15 wt. % to about 17, 18, 19, or 20 wt. % fluorothermoplastic terpolymer, and most preferably the polymer is present in the casting dope at about 16 wt. %.

In certain embodiments, it may be desirable for the casting dope to contain additional substances other than the terpolymer, the solvent, and the nonsolvent.

It has been found that a stable, clear homogeneous casting solution or stable colloidal dispersion can be obtained by dissolving the polymer in a suitable solvents, such as ketones, esters, and ethers. Preferred solvents include, for example, dimethylformamide (DMF), n-butanol, and acetone. Any suitable solvent may be used, however. Examples of other suitable solvents include dipolar aprotic solvents such as methylene chloride, N-methylpyrrolidone, dimethylformamide, dimethylacetamide, dioxane, dimethylsulfoxide, chloroform, tetramethylurea, or tetrachloroethane, and their mixtures. It is generally not preferred to use a highly volatile solvent as the sole solvent in preparing the casting dope, because such solvents may yield dense films with unsatisfactory porosity. However, in certain embodiments it may be desirable to use a highly volatile solvent. Highly volatile solvents may also be preferred components of cosolvent systems when present with a less volatile solvent, as discussed below.

The solvent that may be employed to prepare preferred membranes is typically present at about 15 wt. % or less or about 95 wt. % or more of the casting dope; generally from about 20 wt. % to about 90 wt. %; preferably from about 30, 40, 50, 60, or 70 wt. % to about 86, 87, 88, or 89 wt. %, more preferably from about 71, 72, 73, or 74 wt. % to about 81, 82, 83, 84, or 85 wt. %; and most preferably from about 75, 76, or 77 wt. % to about 78, 79, or 80 wt. % of the solution. The precise amount of solvent to be used is determined by the particular casting dope, including the particular polymer, nonsolvent, and the other conditions of the method of preparation of the particular membrane of interest.

In preferred embodiments, a cosolvent system is used. Such cosolvent systems generally include two or more components of different volatilities. By selecting solvents of appropriate volatility and controlling the proportion of each solvent in the cosolvent system, the pore size and degree of asymmetry of the resulting membrane may be tightly controlled. Solvents of higher volatility generally yield membranes having a greater degree of asymmetry than do solvents of lower volatility. Solvents of higher volatility also tend to yield membranes having a smaller minimum pore size than solvents of lower volatility. By increasing the percentage of the more volatile solvent or solvents in the cosolvent system, the degree of asymmetry and pore size may be reduced. When a cosolvent system is used, it is generally preferred that one or more higher volatility components are present in combination with one or more lower volatility components. The terms "higher volatility" and "lower volatility" refer to relative volatilities when comparing two or more components. Higher volatility components generally have a vapor pressure greater than about 4 mmHg @ 20° C. Lower volatility components generally have a vapor pressure less than about 4 mmHg @ 20° C. In certain embodiments, however, it may be preferred to use a component having a vapor pressure of greater than about 4 mmHg @ 20° C. as the "lower volatility component." Likewise, in certain embodiments it may be preferred to use a component having a vapor pressure of less than about 4 mmHg @ 20° C. as the "higher volatility component."

A nonsolvent may be added to the casting dope. In preferred embodiments, the nonsolvent includes, but is not limited to, water, alcohols, for example, methanol, ethanol, isopropanol, 2-methoxyethanol, amyl alcohols such as t-amyl alcohol, hexanols, heptanols, and octanols; alkanes such as hexane, propane, nitropropane, heptane, and octane; and ketones, carboxylic acids, ethers and esters such as propionic acid, butyl ether, ethyl acetate, and amyl acetate, di(ethyleneglycol) diethylether, di(ethyleneglycol) dibutylether, polyethylene glycol, methylethyl-ketone, methylisobutylketone, glycerol, diethyleneglycol, and their mixtures. By adjusting the proportion of nonsolvent in the casting dope, the degree of asymmetry and pore size may be controlled. While it is generally preferred to use a cosolvent system as described above to control the degree of asymmetry and pore size because of the greater degree of control that may generally be obtained, in certain embodiments it may be preferred to use a solvent/nonsolvent system instead.

The components of the casting dope may be combined in any suitable order. However, it is generally convenient to add nonsolvent, if it is to be used, to the casting dope at the same time as the fluorothermoplastic terpolymer is dissolved in the solvent.

The total amount of nonsolvent which may be employed to prepare the membrane may vary for different nonsolvents, however the preferred amount of nonsolvent is typically from about 1 wt. % or less to about 50 wt. % or more of the casting dope; preferably from about 2 wt. % to about 20, 20, or 40 wt. %; more preferably from about 3 wt. % to about 15 wt. %; and most preferably from about 4, 5, 6, 7, 8, or 9 wt. % to about 10, 11, 12, 13, or 14 wt. % of the casting dope. Selection of the precise amount of nonsolvent to be used is based on the particular casting dope, including the polymer, solvent, and the other conditions of the method of preparation of the particular membrane of interest.

The Casting Process

In general, the overall method of preparing preferred fluorothermoplastic terpolymer membranes includes the steps of providing a casting dope comprising a solution or stable colloidal dispersion. In preferred embodiments, the casting dope is cast as a thin film and exposed to a gaseous environment. Once the casting dope has been exposed to the gaseous environment, it is quenched in a quench bath. After quenching, the resulting fluorothermoplastic terpolymer membrane may be rinsed in a suitable solvent, then air- or oven-dried.

The fluorothermoplastic terpolymer membranes of preferred embodiments can be cast using any conventional procedure wherein the casting solution or dispersion is spread in a layer onto a porous or nonporous support from which the membrane later can be separated after quenching, or upon which the membrane may be retained. The membranes can be cast manually by being poured, cast, or spread by hand onto a casting surface followed by application of a quench liquid onto the casting surface. Alternatively, the membranes may be cast automatically by pouring or otherwise casting the solution or dispersion onto a moving belt. The casting solution or dispersion may be any suitable temperature, i.e., room temperature, or any temperature at which the casting dope is capable of being cast. Preferably, the temperature is between about 10° C. and about 38° C., more preferably between about 16° C. and about 32° C., and most preferably between about 21° C. and about 26° C. In preferred embodiments, the temperature is preferably about room temperature.

One type of moving belt support is polyethylene-coated paper. In casting, particularly in automatic casting, mechanical spreaders can be used. Mechanical spreaders include spreading knives, a doctor blade or spray/pressurized systems. A preferred spreading device is an extrusion die or slot coater which has a chamber into which the casting formulation can be introduced. The casting dope is then forced out of the chamber under pressure through a narrow slot. Membranes may also be cast by means of a doctor blade with a knife gap typically from about 1000 µm or more down to about 900, 800, 700, 600, 500, 400, 350 µm or less. Preferably, the knife gap is about 300, 250, 200, 150, 100 µm or less, and most preferably it is 75 µm or less. The relationship between the knife gap at casting and the final thickness of the membrane is a function of the composition and temperature of the casting dope, the duration of exposure to the gaseous environment, such as humid air, the relative humidity of the air during exposure. In addition, the temperature of the quench bath and many other factors can affect the overall thickness of the final membrane. Membranes typically shrink upon gelling, losing from about 20% to about 80% of their thickness.

In preferred embodiments, the cast film is exposed to a gaseous environment, such as air, sufficiently long to induce formation of surface pores. Another factor that is important to the manufacture of the membranes of the preferred embodiments is the exposure time and exposure conditions that exist between casting and quenching the casting dope. In certain embodiments, the casting solution or dispersion may be exposed to humid air after casting but before quenching. Ambient humidity is acceptable as are other humidity conditions. In a preferred embodiment, the gaseous environment has a relative humidity of between about 50% and about 75%, preferably between about 55% and about 70%, more preferably between about 60% and about 65%, and most preferably about 60%. In certain embodiments, the air may be circulated to enhance contact with the cast solution or dispersion. The gaseous atmosphere may be any suitable temperature, but is typically between about 10° C. and about 30° C., preferably between about 15° C. and about 25° C., and more preferably between about 20° C. and about 25° C. Most preferably, the temperature is from about room temperature to slightly higher than room temperature.

The method of preparing the membranes of the preferred embodiments typically involves a period of exposure to the gaseous environment after casting and before quenching. The exposure time to the gaseous environment is preferably between about 0 seconds and about 10 seconds or more. More preferably, the exposure time is between about 1 second and about 5 seconds, and most preferably between about 1 second and about 2 seconds. Increasing the air exposure time over this range tends to increase permeability and pore size of the resulting membrane.

Following casting and exposure to a gaseous environment, such as air, the cast dispersion or solution is quenched or coagulated. In a preferred embodiment, quenching is accomplished by transporting the cast membrane on a moving belt into the quenching liquid, such as a water bath or a mixture of methanol and water. Most commonly, the quenching or coagulating liquid is water, however, any suitable liquid or mixture of liquids that is not a solvent for the resulting fluorothermoplastic terpolymer membrane may be used. In the quench or coagulating bath, the polymer precipitates or coagulates to produce the desired porous reticulated structure.

The temperature of the quench bath can affect the porosity of the membrane. In general, warmer quench baths result in more porous membranes. Generally, a wide temperature range may be utilized in the quenching step, ranging from about −2° C. to about 40° C., preferably from about 5° C. to about 30° C., and more preferably from about 10° C. to about 25° C. The lower temperature limit is determined by the freezing point of the particular quench liquid. Preferably, the quench liquid is water and the quenching temperature is about 20° C. The temperature of the quench bath may cause marked changes in the pore diameters of the membrane. Where higher quench temperatures are utilized, the membranes possess larger pores. Conversely, where lower temperatures are utilized, smaller pores form.

Membranes are recovered from the quench bath in the conventional manner by physical removal. The resulting fluorothermoplastic terpolymer membrane is typically washed free of solvent and may be dried to expel additional increments of solvent, diluent, and quench liquid. Washing liquids include any suitable liquid that is not a solvent for the resulting fluorothermoplastic terpolymer membrane. In a preferred embodiment, the rinse liquid is deionized water. The membranes may be dried by air-drying or oven drying. In a preferred embodiment, the fluorothermoplastic terpolymer membrane is air dried at room temperature. If drying at elevated temperature, e.g., in an oven, is performed, the temperature is typically selected such that exposure of the membrane to that temperature does not substantially affect the performance characteristics of the membrane, for example, by melting the polymer comprising the membrane. Drying temperatures from below room temperature to slightly below the melting point of the fluorothermoplastic terpolymer are typically used. Preferably, drying temperatures ranging from about 50° C. to about 100° C., more preferably from about 60° C. to about 90° C., and most preferably from about 70° C. to about 80° C. are used. It is preferred to circulate the air in oven so as to ensure rapid and even drying. The humidity of the air in the oven need not be controlled. However, drying tends to be more rapid at lower humidity levels.

The fluorothermoplastic terpolymer membranes produced by the methods described above may be from about 100 µm thick or less to about 500 µm thick or more. Preferably, the thickness of the membrane is about 500 µm, including any supporting material, and is preferably about 75 µm not including any supporting material. However, any useful thickness of membrane can be prepared by varying the process parameters following the teachings herein.

Membrane Architecture

Fluorothermoplastic terpolymer membranes of the preferred embodiments are typically made from tetrafluoroethylene, hexafluoropropylene, and vinylidene fluoride terpolymer. The membranes may be isotropic or asymmetric. Asymmetries in pore size typically range from about 1:1.5 or less to about 1:20 or more, more preferably from about 1:1.5 to about 1:10, and most preferably from about 1:2 to about 1:5. Pore sizes preferably range from about 0.001 μm or less to about 20 μm or more, more preferably from about 0.005 μm to about 10 μm, and most preferably from about 0.005 μm to about 5 μm.

Pore diameter in preferred fluorothermoplastic terpolymer membranes is generally estimated by porometry analysis. Porometry measurements give the "mean flow pore diameter" (MFP diameter, also referred to as MFP size) of the membrane. The MFP diameter is the average size of the limiting pores in a membrane. The MFP diameter is based on the pressure at which air flow begins through a pre-wetted membrane (the bubble point pressure) compared to the pressure at which the air flow rate through a pre-wetted membrane is half the air flow rate through the same membrane when dry (the mean flow pore pressure). A Coulter Porometer, manufactured by Beckman Coulter Inc. of Fullerton, Calif., is typically used for analysis of MFP diameter and minimum pore size. The membranes of the preferred embodiments typically have MFP diameters ranging from about 0.01 μm or less to about 5 μm or more, preferably from about 0.05 μm to about 4 μm, more preferably from about 0.10, 0.11, 0.12, 0.13, 0.14, 0.15, 0.16, 0.17, 0.18, 0.19, μm to about 3.5 μm, and most preferably from about 0.20, 0.25, 0.30, 0.35, 0,40, 0.45, 0.50, 0.55, 0.60, 0.65, 0.70, 0.75, 0.80, 0.85, 0.90, or 0.95 μm to about 1.0, 1.1, 1.2, 1.3, 1.4, 1.5, 1.6, 1.8, 2.0, 2.2, 2.4, 2.6, 2.8, 3.0, 3.2, or 3.4 μm. However, in certain embodiments higher or lower MFP diameters may be preferred.

Hydrophobic filters resist being penetrated by water. Such penetration can, however, be induced by imposing a pressure sufficient to penetrate water into the filter pores. The magnitude of the pressure required to penetrate the water varies indirectly with the sizes of the pores. Measurement of the penetration pressure therefore provides a gauge of the largest size pores present in the filter.

Composites Including Fluorothermoplastic Terpolymer Membranes

In preferred embodiments, the fluorothermoplastic terpolymer membranes are fabricated into composite membranes or filters. Such composites have multiple layers and are useful in a variety of separation applications. In many cases, the various layers of a composite membrane or filter each impart different desirable properties. For example, in some applications, an extremely thin membrane may have advantageous flow rates in separations of very small particles, gasses, and the like. Yet such a thin membrane may be fragile and difficult to handle or to package into cartridges. In such cases, the fragile, thin layer membrane may be combined with a support material as a backing to form a composite having improved strength and handling characteristics without sacrificing the separations properties of the thin layer membrane. Other desirable properties imparted by forming a composite membrane may include increased burst strength, increased tensile strength, increased thickness, and superior prefiltration capability.

Composite membranes or filters incorporating the membranes of the preferred embodiments may be prepared using lamination techniques. In a typical lamination process, for example, the membrane and one or more additional sheets are layered together to form a stack, which is then laminated into an integral composite under application of heat and pressure. An adhesive substance may be placed in between the membrane and the adjacent sheet prior to lamination to facilitate binding and lamination of the membrane and sheet to each other.

Another approach to preparing composite membranes is to cast or form one membrane layer in situ on top of another layer such as, for example, a woven or nonwoven support. Suitable supports include polymeric nonwoven materials. In a preferred embodiment, the support is a nonwoven polyester material. However, any suitable substrate may be used. Alternatively, the membrane may be cast or formed on top of another layer, such as, for example, a membrane or other backing material.

Any fluorothermoplastic terpolymer membrane that may be prepared according to the preferred embodiments by a casting or other process, that possesses the pore size criteria described above is generally suitable for use in the present invention.

EXAMPLES

The following examples are provided to illustrate the preferred embodiments. However, such examples are merely illustrative and are not intended to limit the subject matter of the application.

Example 1

A casting solution was prepared containing 15 wt. % Dyneon™ THV 220A, 5 wt. % n-butanol (Crown Chemical of San Diego, Calif.) and 80 wt. % DMF (E. I. du Pont de Nemours and Company of Wilmington, Del.) as the solvents. The Dyneon™ THV 220A was added to the solvents and the mixture was heated to about 50 to 60° C. with mixing. A membrane was cast onto a moving belt of polyethylene coated paper using a casting knife with a knife gap of approximately 0.20 mm (approximately 8 mils). The solution was cast at room temperature. The membrane was exposed to air (at room temperature, 60% R.H.) for approximately 1 to 2 seconds before quenching. The membrane was quenched in a water bath having a temperature of about 20° C. for more than 10 minutes.

Figure 1B:
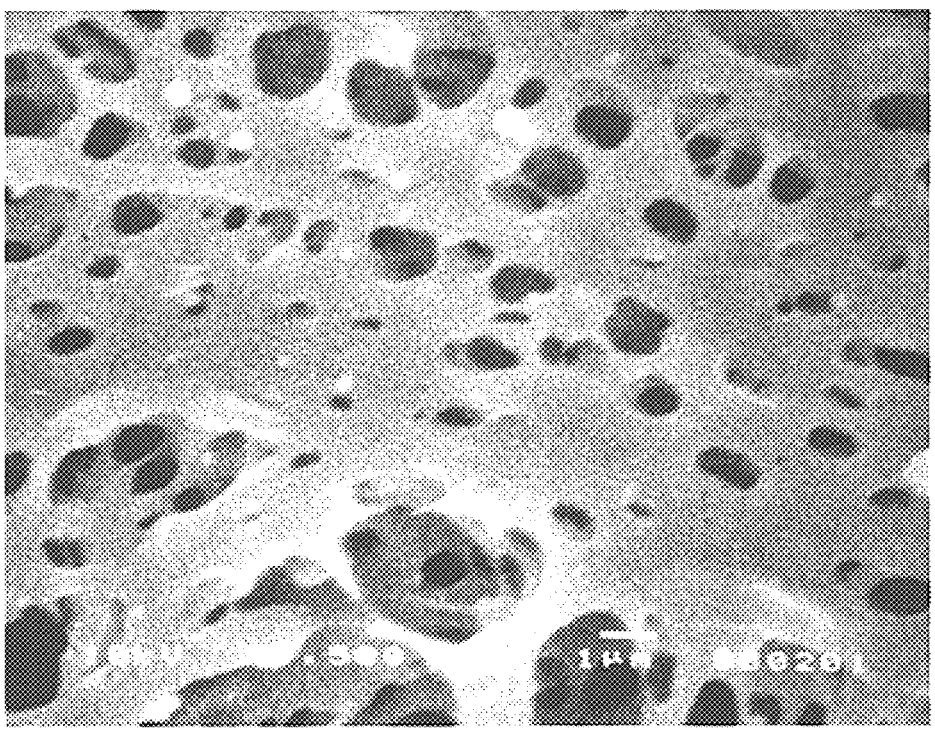
FIG. 1b provides a SEM image of the dull side of the membrane of Example 1.

After quenching, the membrane was rinsed with deionized water and then air-dried at room temperature for approximately 30 minutes. The membrane was hydrophobic (not wettable by water). The membrane was tested for water penetration pressure and water flow at 69 kPa (10 psid) on a 90-mm diameter disk. The membrane exhibited an 1100 ml/min water flow rate and a water penetration of 18 psi. The surfaces of the membranes were examined by Scanning Electron Microscopy (SEM). FIG. 1a provides a SEM image of the skin side of the membrane and FIG. 1b provides a SEM image of the dull side of the membrane. The membrane was highly asymmetric (degree of asymmetry of approximately 50:1) and had a mean flow pore size of 1.02 μm.

Example 2

Figure 2A:
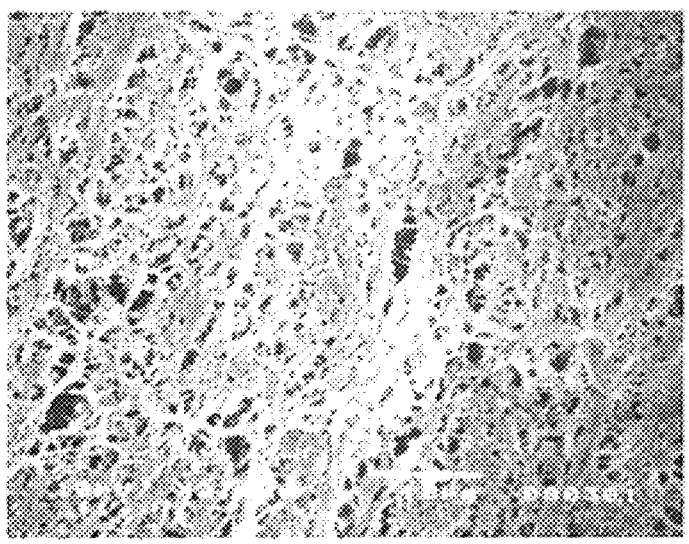
FIG. 2a provides a SEM image of the skin side of the membrane of Example 2.
Figure 2B:
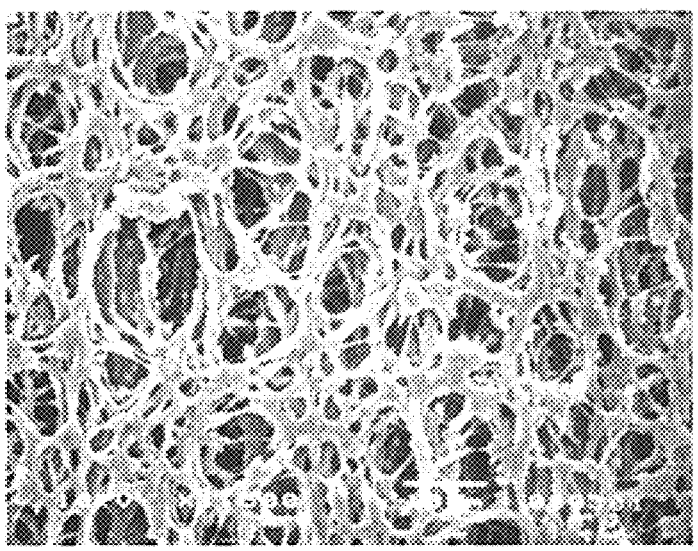
FIG. 2b provides a SEM image of the dull side of the membrane of Example 2.
Figure 2C:
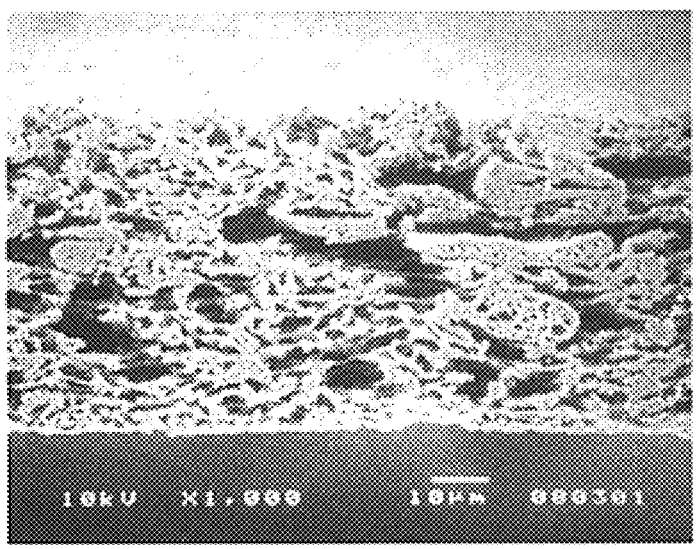
FIG. 2c provides a SEM image of the cross-section of the membrane of Example 2.

A casting solution was prepared containing 15 wt. % Dyneon™ THV220A and 85 wt. % DMF as the solvent using the method as described in Example 1. The resulting membrane was hydrophobic (not wettable by water). The membrane was tested for water penetration pressure and water flow as described in Example 1. The membrane exhibited a 7000 ml/min water flow rate and a water penetration of 6 psi. FIG. 2a provides a SEM image of the skin side of the membrane, FIG. 2b provides a SEM image of the dull side of the membrane, and FIG. 2c provides a SEM image of the cross-section of the membrane. The membrane was asymmetric (degree of asymmetry of approximately 50:1) and had a mean flow pore size of 3.3 μm.

Example 3

Figure 3A:
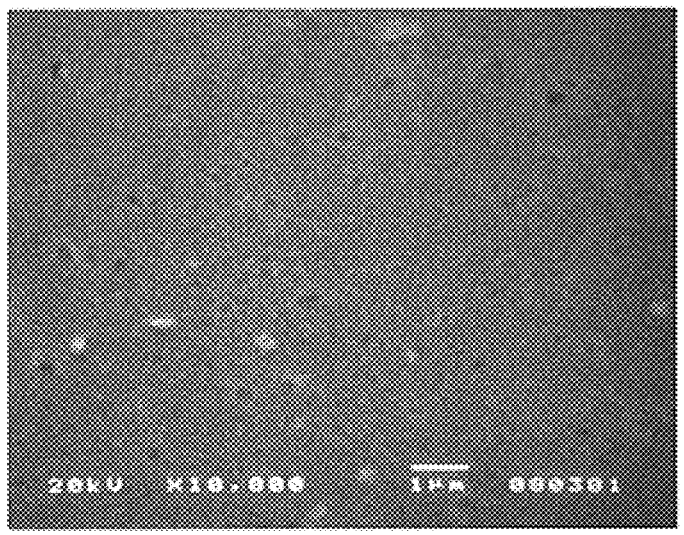
FIG. 3a provides a SEM image of the skin side of the membrane of Example 3.
Figure 3B:
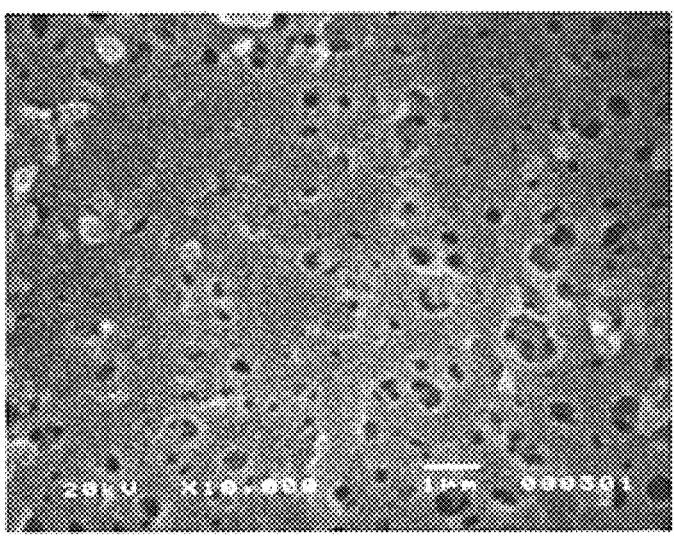
FIG. 3b provides a SEM image of the dull side of the membrane of Example 3.
Figure 3C:
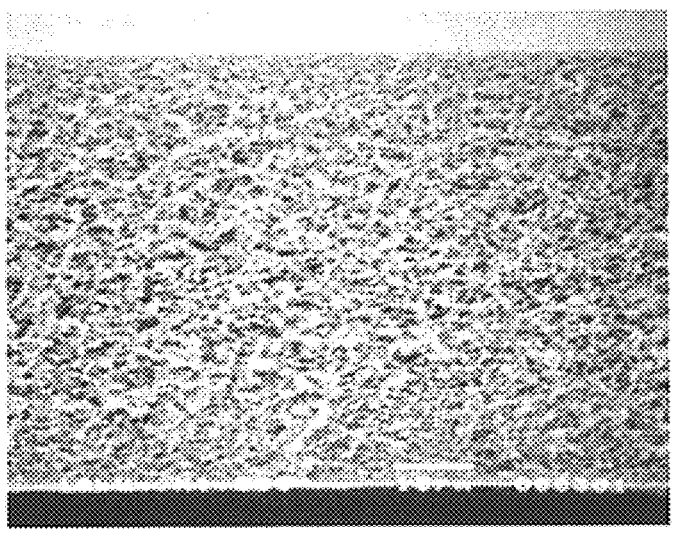
FIG. 3c provides a SEM image of the cross-section of the membrane of Example 3.

A casting solution was prepared containing 15 wt. % Dyneon™ THV220A, 10% n-butanol, and 75 wt. % DMF as the solvent using the method as described in Example 1. The resulting membrane was hydrophobic (not wettable by water). The membrane was tested for water penetration pressure as described in Example 1. The membrane exhibited a water penetration of 50 psi. FIG. 3a provides a SEM image of the skin side of the membrane, FIG. 3b provides a SEM image of the dull side of the membrane, and FIG. 3c provides a SEM image of the cross-section of the membrane. The membrane was asymmetric (degree of asymmetry of approximately 5:1) and had a mean flow pore size of 0.18 µm.

Example 4

Figure 4A:
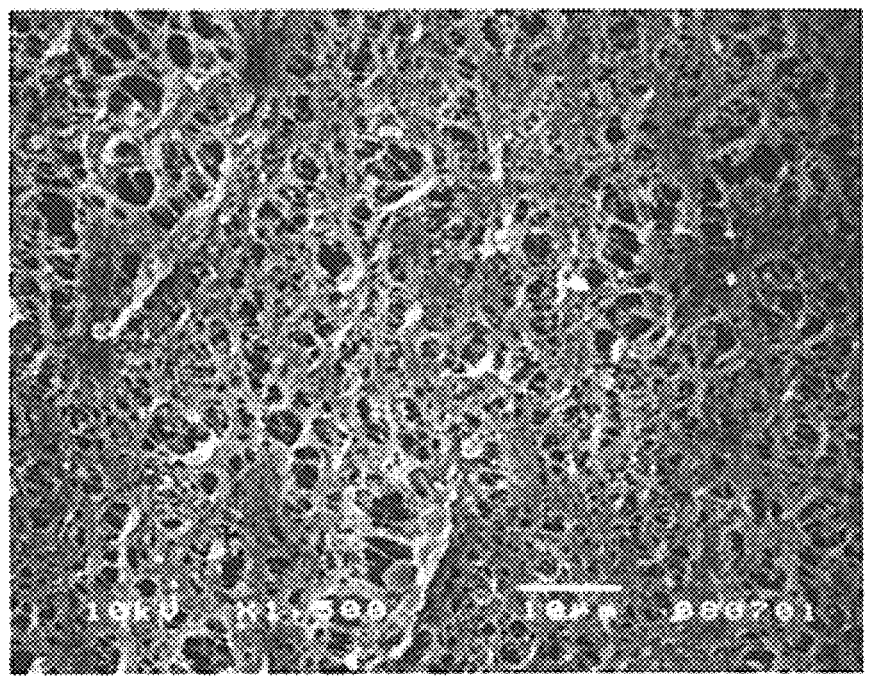
FIG. 4a provides a SEM image of the skin side of the membrane of Example 4.
Figure 4B:
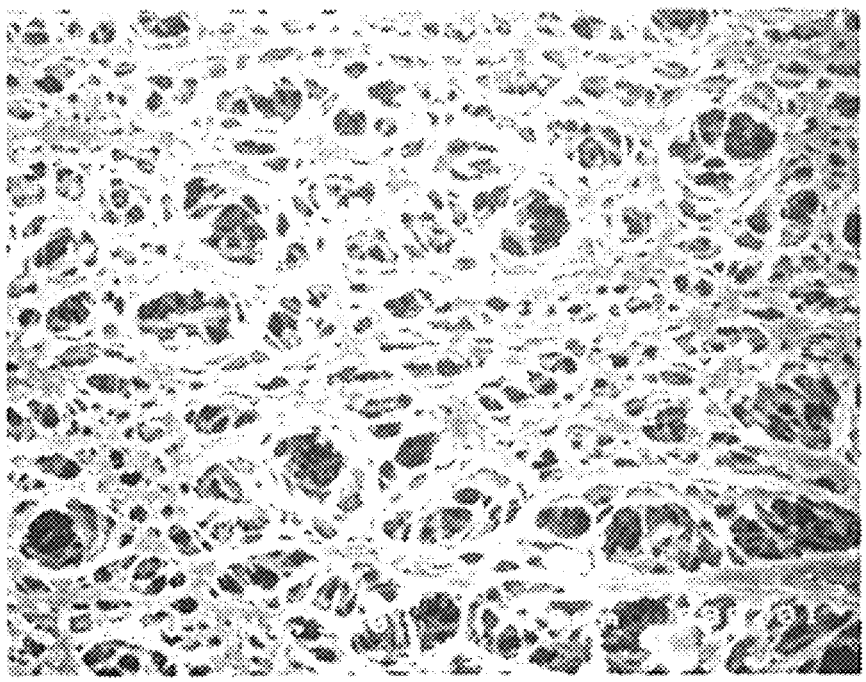
FIG. 4b provides a SEM image of the dull side of the membrane of Example 4.

A casting solution was prepared containing 14 wt. % Dyneon™ THV 220A, 3% n-butanol, and 83 wt. % DMF as the solvent using the method as described in Example 1. The resulting membrane was hydrophobic (not wettable by water). The membrane was tested for water penetration pressure and water flow as described in Example 1. The membrane exhibited a 1200 ml/min water flow rate and a water penetration of 15 psi. FIG. 4a provides a SEM image of the skin side of the membrane and FIG. 4b provides a SEM image of the dull side of the membrane. The membrane was asymmetric (degree of asymmetry of approximately 20:1) and had a mean flow pore size of 1.1 µm.

Example 5

Figure 5A:
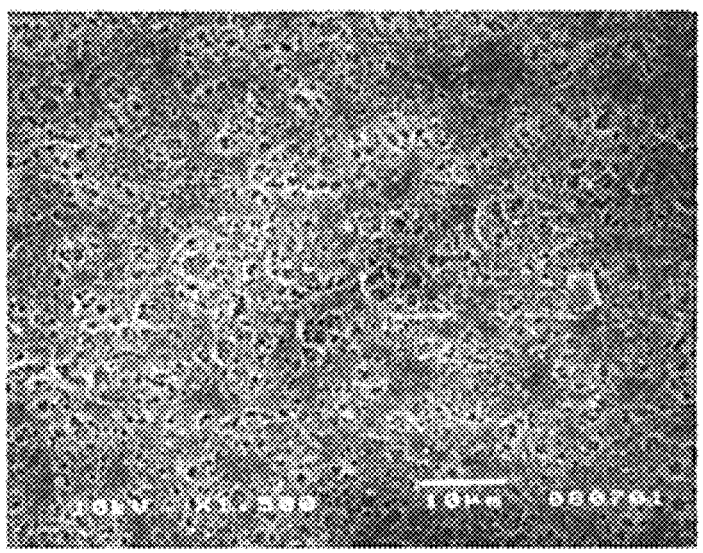
FIG. 5a provides a SEM image of the skin side of the membrane of Example 5.
Figure 5B:
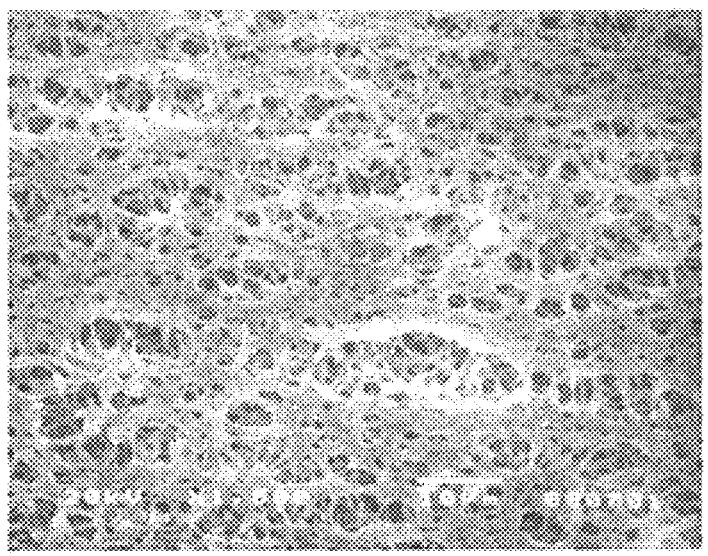
FIG. 5b provides a SEM image of the dull side of the membrane of Example 5.
Figure 5C:
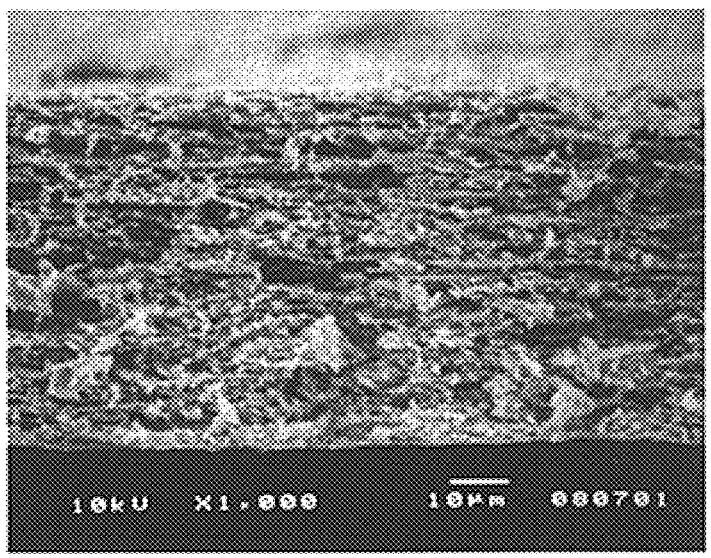
FIG. 5c provides a SEM image of a cross-section of the membrane of Example 5.

A casting solution was prepared containing 16 wt. % Dyneon™ THV220A, 8% n-butanol, and 76 wt. % DMF as the solvent using the method as described in Example 1. The resulting membrane was hydrophobic (not wettable by water). The membrane was tested for water penetration pressure and water flow as described in Example 1. The membrane exhibited a 1500 ml/min water flow rate and a water penetration of 32 psi. FIG. 5a provides a SEM image of the skin side of the membrane, FIG. 5b provides a SEM image of the dull side of the membrane, and FIG. 5c provides a SEM image of a cross-section of the membrane. The membrane was asymmetric (degree of asymmetry of approximately 10:1) and had a mean flow pore size of 0.76 µm.

A comparison of MFP size, water flow, and water penetration for the membranes of Examples 1–5 is provided in Table 1. The data indicate that as the percentage of the more volatile component (n-butanol) in the casting dope is increased, MFP size decreases along with water flow rate, and that the water penetration pressure increases.

TABLE 1

| Example # | % Butanol | MFP Size (µm) | Water flow (ml/min for 90 mm disc @ 10 psi) | Water Penetration Pressure (psi) |
|---|---|---|---|---|
| 2 | 0 | 3.3 | 7,000 | 6 |
| 4 | 3 | 1.1 | 1,200 | 15 |
| 1 | 5 | 1.02 | 1,100 | 18 |
| 5 | 8 | 0.76 | 1,500 | 32 |
| 3 | 10 | 0.18 | NA | 50 |

Example 6

Figure 6A:
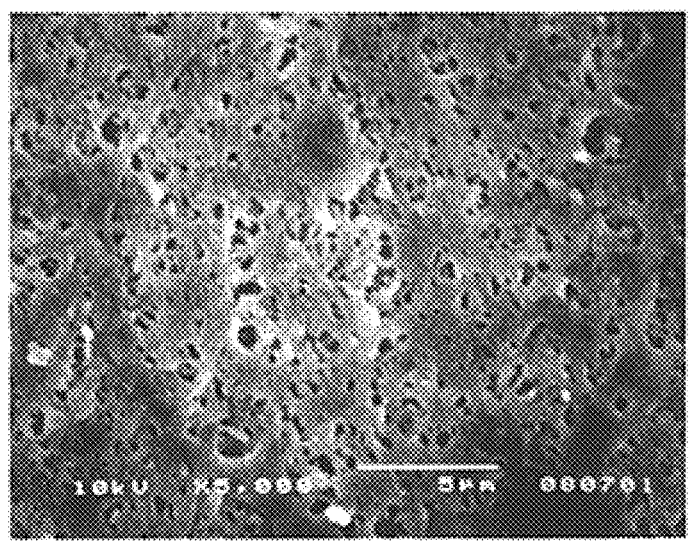
FIG. 6a provides a SEM image of the skin side of the membrane of Example 6.
Figure 6B:
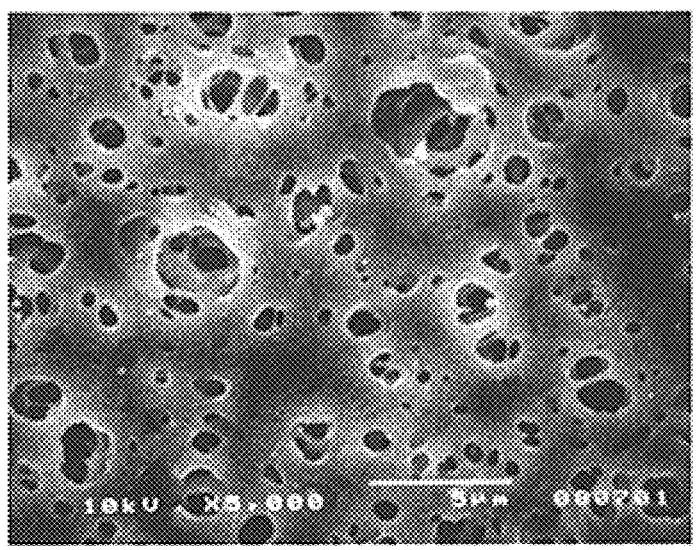
FIG. 6b provides a SEM image of the dull side of the membrane of Example 6.
Figure 6C:
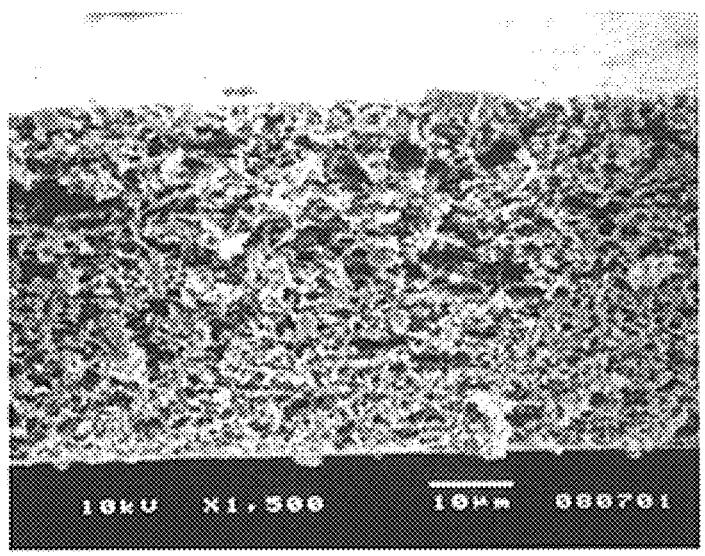
FIG. 6c provides a SEM image of a cross-section of the membrane of Example 6.

A casting solution was prepared containing 16 wt. %/o Dyneon™ THV220A, 5% acetone (Sigma-Aldrich Company of St. Louis, Mo.), and 81 wt. % DMF as the solvent using the method as described in Example 1. The resulting membrane was hydrophobic (not wettable by water). The membrane was tested for water penetration pressure and water flow as described in Example 1. The membrane exhibited a 1440 ml/min water flow rate and a water penetration of 20 psi. FIG. 6a provides a SEM image of the skin side of the membrane, FIG. 6b provides a SEM image of the dull side of the membrane, and FIG. 6c provides a SEM image of a cross-section of the membrane. The membrane was asymmetric (degree of asymmetry of approximately 20:1) and had a mean flow pore size of 0.475 µm.

Example 7

Figure 7A:
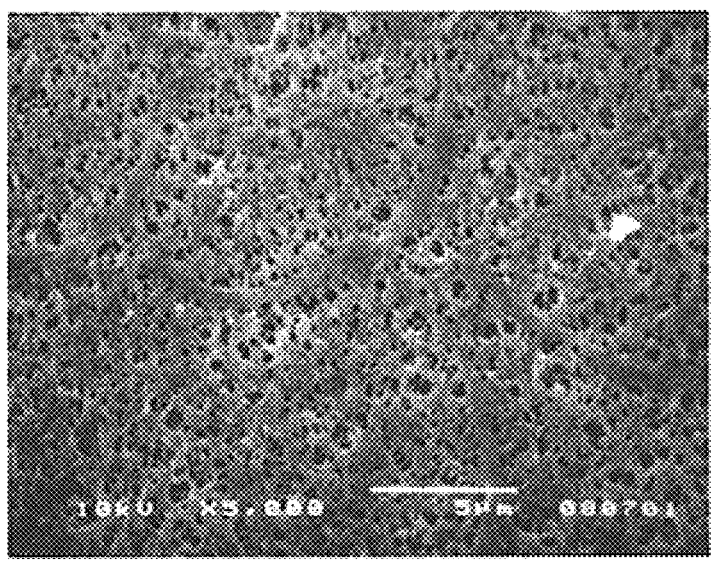
FIG. 7a provides a SEM image of the skin side of the membrane of Example 7.
Figure 7B:
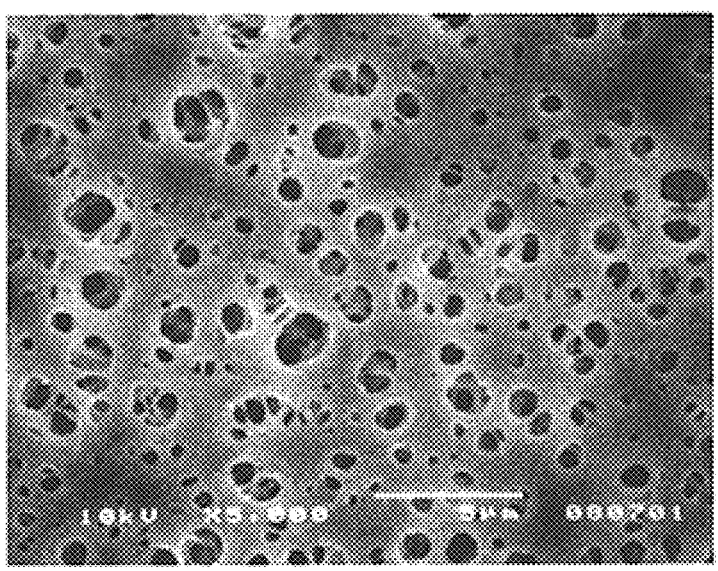
FIG. 7b provides a SEM image of the dull side of the membrane of Example 7.
Figure 7C:
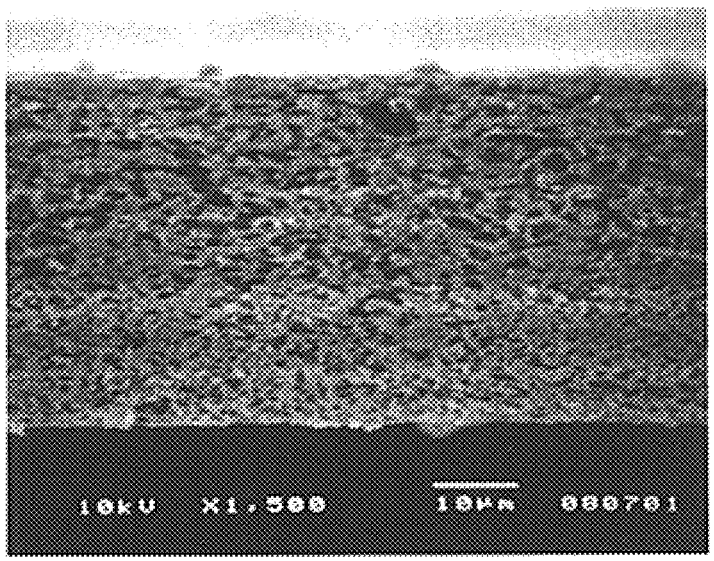
FIG. 7c provides a SEM image of a cross-section of the membrane of Example 7.

A casting solution was prepared containing 14 wt. % Dyneon™ THV220A, 10% acetone, and 75 wt. % DMF as the solvent using the method as described in Example 1. The resulting membrane was hydrophobic (not wettable by water). The membrane was tested for water penetration pressure and water flow as described in Example 1. The membrane exhibited a 960 ml/min water flow rate and a water penetration of 40 psi. FIG. 7a provides a SEM image of the skin side of the membrane, FIG. 7b provides a SEM image of the dull side of the membrane, and FIG. 7c provides a SEM image of a cross-section of the membrane. The membrane was asymmetric (degree of asymmetry of approximately 20:1) and had a mean flow pore size of 0.356 µm.

A comparison of MFP size, water flow, and water penetration for the membranes of Examples 2, 6, and 7 is provided in Table 1. The data indicate that as the percentage of the more volatile solvent (acetone) in the casting dope is increased, MFP size decreases along with water flow rate and the water penetration pressure increases.

| Example # | % acetone | MFP Size (µm) | Water flow (ml/min for 90 mm disc @ 10 psi) | Water Penetration Pressure (psi) |
|---|---|---|---|---|
| 2 | 0 | 3.3 | 7,000 | 6 |
| 6 | 5 | 0.47 | 1,440 | 20 |
| 7 | 10 | 0.36 | 960 | 40 |

Example 8

Figure 8:
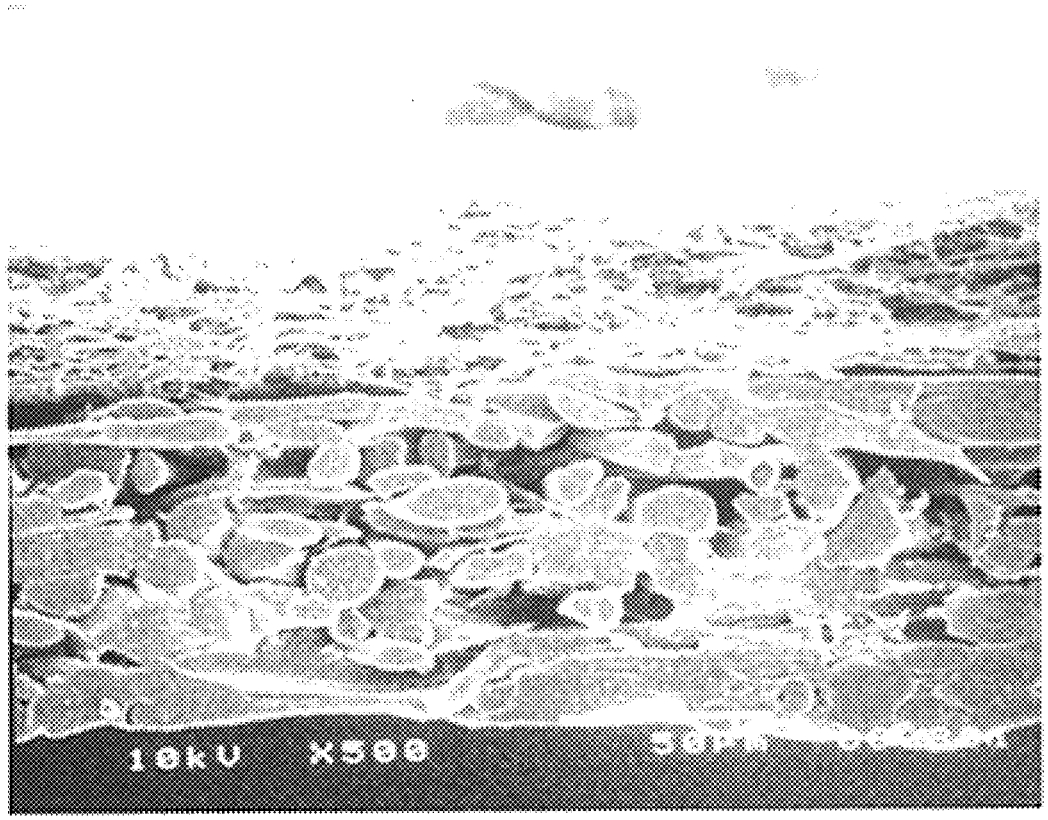
FIG. 8 provides a SEM image of a cross-section of the membrane of Example 8.

A casting solution was prepared containing 16 wt. % Dyneon™ THV 220A, 8% n-butanol, and 76 wt. % DMF as the solvent as in Example 5. A membrane was cast onto a polyester nonwoven support (Reemay R-125-F available from BBA Nonwovens Reemay, Inc. of Old Hickory, Tenn.) using a casting knife with a knife gap of approximately 0.20 mm (8 mil). Casting conditions were the same as in Example 5. The membrane was hydrophobic (not wettable by water). The membrane was tested for MFP size, water penetration pressure, and water flow as in Example 5, and gave similar results as the unsupported membrane in Example 5. FIG. 8 provides a SEM image of a cross-section of the membrane.

The preferred embodiments have been described in connection with specific embodiments thereof. It will be understood that it is capable of further modification, and this application is intended to cover any variations, uses, or adaptations of the invention following, in general, the principles of the invention and including such departures from the present disclosure as come within known or customary practices in the art to which the invention pertains and as may be applied to the essential features hereinbefore set forth, and as fall within the scope of the invention and any equivalents thereof.

What is claimed is:

1. A flat sheet membrane, the membrane cast from a dope comprising a solvent and a terpolymer of tetrafluoroethylene, vinylidene fluoride, and hexafluoropropylene, the membrane having a first porous face having a first average pore diameter, a second porous face having a second average pore diameter, and a porous supporting structure therebetween wherein the supporting structure comprises a reticulated network of flow channels, and wherein the porous faces and the porous supporting structure comprise a network of structural surfaces capable of contacting a filter stream.

2. The membrane of claim 1, wherein the membrane comprises an isotropic membrane.

3. The membrane of claim 1, wherein the first and second average pore diameters have an asymmetry of at least about 2:1.

4. The membrane of claim 1, wherein the first and second average pore diameters have an asymmetry of at least about 5:1.

5. The membrane of claim 1, wherein the first and second average pore diameters have an asymmetry of at least about 10:1.

6. The membrane of claim 1, wherein the first and second average pore diameters have an asymmetry of at least about 20:1.

7. The membrane of claim 1, wherein the dope comprises a dispersion of the terpolymer in the solvent.

8. The membrane of claim 1, wherein the dope comprises a homogeneous solution of the terpolymer in the solvent.

* * * * *